(12) United States Patent
Ali et al.

(10) Patent No.: US 8,381,233 B2
(45) Date of Patent: Feb. 19, 2013

(54) EXTENSIBILITY MODEL FOR STREAM-BASED OPERATORS AND AGGREGATES

(75) Inventors: Mohamed H. Ali, Kirkland, WA (US); Tomer Verona, Redmond, WA (US); Balan Sethu Raman, Redmond, WA (US); Beysim Sezgin, Redmond, WA (US); Jonathan D. Goldstein, Kirkland, WA (US); Badrish Chandramouli, Bellevue, WA (US); Ping Wang, Sammamish, WA (US); Roman Schindlauer, Seattle, WA (US); Asvin Ananthanarayan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 12/777,259

(22) Filed: May 11, 2010

(65) Prior Publication Data

US 2011/0283295 A1    Nov. 17, 2011

(51) Int. Cl.
*G06F 3/00* (2006.01)
(52) U.S. Cl. ........................................................ 719/318
(58) Field of Classification Search .................... 719/318
See application file for complete search history.

(56) References Cited

U.S. PATENT DOCUMENTS

| | | | |
|---|---|---|---|
| 7,376,656 B2 | 5/2008 | Blakeley et al. | |
| 7,451,436 B2 | 11/2008 | Walpole | |
| 7,664,830 B2 * | 2/2010 | Rising, III | 709/218 |
| 7,925,138 B2 * | 4/2011 | Ando et al. | 386/240 |
| 2001/0029548 A1 * | 10/2001 | Srikantan et al. | 709/250 |
| 2004/0268224 A1 * | 12/2004 | Balkus et al. | 715/500.1 |
| 2007/0244700 A1 * | 10/2007 | Kahn et al. | 704/235 |
| 2009/0019005 A1 | 1/2009 | Hu et al. | |
| 2009/0106198 A1 | 4/2009 | Srinivasan et al. | |
| 2009/0319501 A1 | 12/2009 | Goldstein et al. | |
| 2010/0067417 A1 * | 3/2010 | Zhou et al. | 370/311 |
| 2010/0284281 A1 * | 11/2010 | Sperschneider | 370/242 |

OTHER PUBLICATIONS

Hldeyuki, Real-time Mach: Towards a Predictable Real-time, 1990.*
Ding, et al., "Temporal Data Type and Temporal Relation Operations", Retrieved at << Ieeexplore.ieee.org/stamp/stamp.jsp?arnumber=01635082 >>, Proceedings of the 2005, IEEE International Conference on Information Acquisition, Jun. 27-Jul. 3, 2005.
Bohlen, et al., "How Would You Like to Aggregate Your Temporal Data?", Retrieved at << ieeexplore.ieee.org/stamp/stamp.jsp?arnumber=01635990 >>, TIME, Proceedings of the Thirteenth International Symposium on Temporal Representation and Reasoning, Jun. 15-17, 2006.

(Continued)

*Primary Examiner* — Lechi Truong

(57) ABSTRACT

An extensibility framework that allows a user to write user-defined modules that include user-defined operators (UDO) and user-defined aggregators (UDA) in a non-temporal fashion without the need to worry about temporal attributes of events (or event types). The temporal domain is managed on behalf of the user, and allows the user to write operators and aggregates in the temporal data streaming domain as well as to port existing libraries of non-temporal UDOs/UDAs to the temporal data streaming domain. Temporal attributes and event types are managed for non-temporal UDOs/UDAs by the extensibility framework on behalf of the UDO/UDA writer. Windows can be employed to bridge the gap between the non-temporal domains and temporal domains. Support for complex event processing (CEP) is provided in UDOs/UDAs for base classes related to a CEP operator, CEP aggregate, CEP time sensitive operator, and CEP time sensitive aggregate.

19 Claims, 10 Drawing Sheets

OTHER PUBLICATIONS

Yang, et al., "Maintaining Temporal Views over Non-Temporal Information Sources for Data Warehousing", Retrieved at << ftp://reports.stanford.edu/www/pub/public_html/public_html/dbpubs/1998/54/54.pdf.gz >>, Extending Database Technology, vol. 1377, Proceedings of the 6th International Conference on Extending Database Technology: Advances in Database Technology, Mar. 23-27, 1998.

"CEP LINQ Query Examples: Extending Queries with User-Defined Aggregates and Operators", Retrieved at << msdn.microsoft.com/en-us/library/ee842720(SQL.105).aspx >>, Retrieved Date: Feb. 1, 2010.

Hong, et al., "Consistent Streaming Through Time", Retrieved at << http://www.uvm.edu/~skunta/CEP/Byung'sCEP/CEDR_MicrosoftTR07.pdf >>, CIDR 2007, Third Biennial Conference on Innovative Data Systems Research, Jan. 7-10, 2007.

"Using Event Windows", Retrieved at << msdn.microsoft.com/en-us/library/ee842704(SQL.105).aspx >>, Retrieved Date: Feb. 1, 2010.

\* cited by examiner

EXTENSIBILITY MODEL FOR STREAM-BASED OPERATORS AND AGGREGATES

BACKGROUND

Traditional database systems have been in existence for some time and are employed to serve the needs of many different information uses. Such database systems are typically referred to as persistent systems where data is stored and later accessed for processing, analysis, mining, etc. However, such traditional persistent systems do not support a new class of continuous time-varying data as in stream-based data systems. Stream-based data systems can be found in applications where data is continuously received asynchronously such as in web applications (website visits), financial institutions, sensor systems, and telecommunications environments (e.g., call records), for example. While users have become adept at programming for persistent data systems, the learning curve is more difficult for stream-based systems.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an extensibility framework that allows a user to write user-defined modules that include user-defined operators (UDO) and user-defined aggregators (UDA) in a non-temporal fashion without the need to worry about temporal attributes of events (or event types). The architecture manages the temporal domain on behalf of the user, and allows the user to write operators and aggregates in the temporal data streaming domain as well as to port existing libraries of non-temporal UDOs/UDAs to the temporal data streaming domain.

The architecture manages temporal attributes and event type for non-temporal UDOs/UDAs by the extensibility framework on behalf of the UDO/UDA writer. Windows can be employed to bridge the gap between the non-temporal domains and temporal domains, the windows including a snapshot window, tumbling window, hopping window, and count window, for example. Support is provided for time insensitive and time sensitive UDOs/UDAs. The UDO/UDA have the option to read and incorporate the temporal attributes of events in associated logic. The architecture also includes current time increment push backward for non-snapshot window operators. Moreover, complex event processing (CEP) is supported in UDOs/UDAs for base classes related to a CEP operator, CEP aggregate, CEP time sensitive operator, and CEP time sensitive aggregate.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
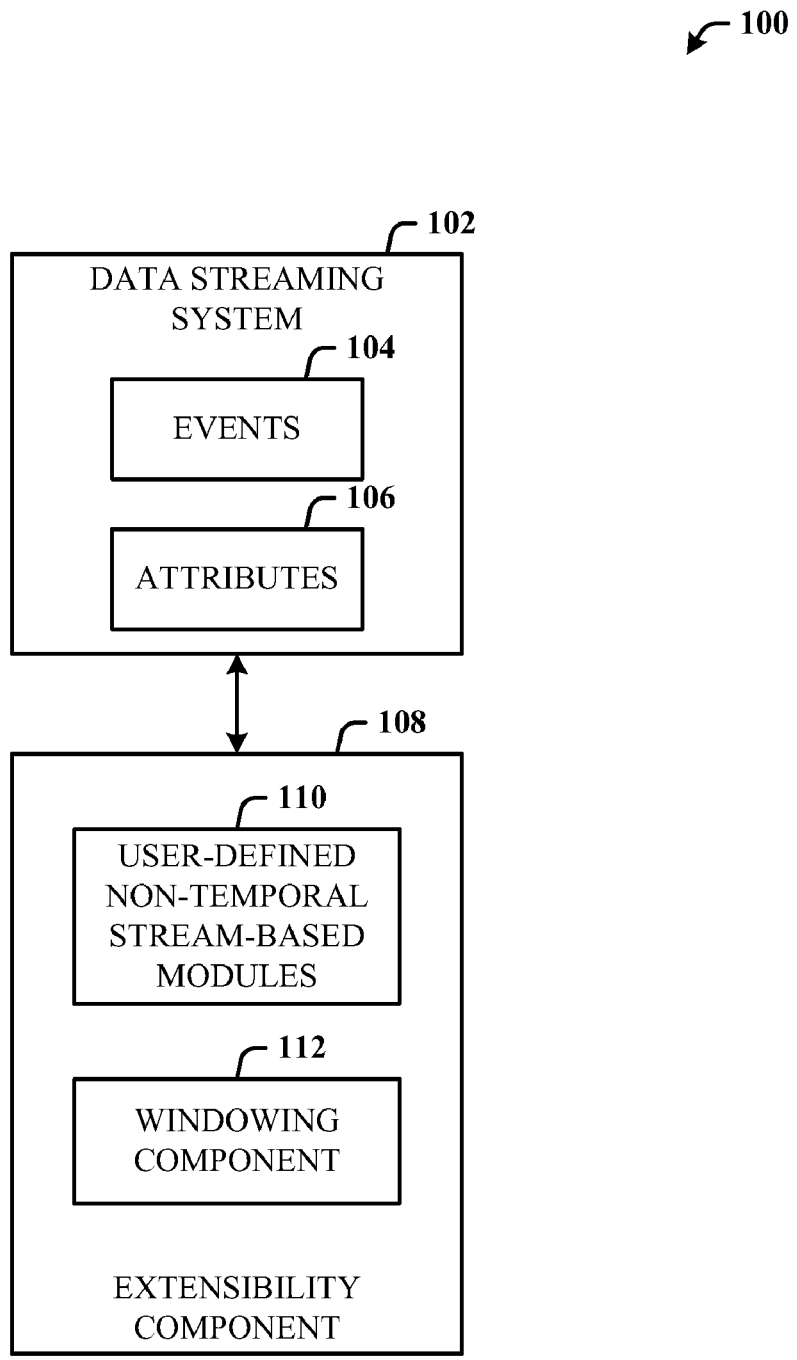
FIG. 1 illustrates a stream-based system in accordance with the disclosed architecture.

A data streaming system is typically deployed in a multiple domains such as web click analytics, monitoring manufacturing plants, financial and trading systems, sensors, location readings generated by mobile devices, etc. Since data stream systems include temporal attributes with each event/tuple (e.g., event start and end times) as well as the event type, it can be a challenge for writers of the user-defined operator (UDO) and a user-defined aggregate (UDA) to manage these attributes. Hence, there is a need to give customers from different domains the capability to write and execute logic as UDOs and UDAs.

The disclosed architecture addresses the problem of how to provide the user of a data streaming system the capability to write and execute code within the system. In other words, to enable the user to write the UDO and UDA, and execute the UDO and UDA as part of the query pipeline. Users with different domain expertise can now leverage and deploy the streaming system in associated domains. The user can write UDO/UDA in a non-temporal fashion and the extensibility framework manages the temporal domain for the user. Hence, this feature bridges the gap between temporal and non-temporal domains and gives the possibility of porting libraries of existing non-temporal UDOs/UDAs to the temporal data streaming domain.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a stream-based system 100 in accordance with the disclosed architecture. The system 100 includes a data streaming system 102 that includes events 104 and associated event attributes 106 occurring in temporal domain, and an extensibility component 108 that facilitates creation and application of non-temporal user-defined stream-based modules 110 to the data streaming system 102 in the temporal domain. As described in greater detail below, the stream-based modules 110 are user-defined stream-based operators and user-defined stream-based aggregators. The stream-based modules 110 are time sensitive and time insensitive.

The system 100 further comprises a windowing component 112 that employs a time window which divides an infinite timeline of streaming data into overlapping segments. Additionally, the windowing component 112 employs a time window which divides an infinite timeline of streaming data into non-overlapping segments.

The stream-based modules 110 include complex event processing (CEP) base classes. The stream-based modules 110 can also include window-based operators associated with a current time increment (CTI) event which guarantees that no changes occur before a start time of an event by moving the CTI timestamp to a beginning of a window. The CTI timestamp is propagated to an output of an output method for non-window-based operators.

There are several distinctions between the data streaming world and the traditional database world. In the data streaming model, each tuple has two temporal attributes that denote the validity interval of the tuple (valid start time (Vs) and Valid EndTime (Ve)). A tuple timestamped with these temporal attributes is referred to as an "event". Moreover, to support the notion of speculation, the system supports four different types of events.

Insert (Vs, Ve, Payload)—insert a new event with validity interval between [Vs, Ve); Retract (Vs, Ve, NewVe Payload)—retract or shrink the validity interval of a previously generated event (Vs, Ve, Payload) to [Vs, NewVe); Expand (Vs, Ve, NewVe Payload)—Expand the validity interval of a previously generated event (Vs, Ve, Payload) to [Vs, NewVe); and CTI(Vs) or CurrentTimeIncrement—a guarantee that no changes (insert retract, or expand) occur before the Vs time. CTI is used to give stability guarantees on the past in order to clean up the system states.

Since insert, retract, expand, and CTI event types are designed for data streaming systems as well as the validity interval timestamps (valid start time (Vs) and Valid EndTime (Ve)), it is a challenge for UDO/UDA writers coming from a traditional database background to manage these attributes.

Based on the disclosed architecture, UDO/UDA writers now have the capability to write UDOs/UDAs without concern about event types and validity interval timestamps. In other words, the UDO/UDA user writes UDO/UDA in terms of payloads only, and the extensibility framework manages the event types as well as the temporal validity attributes on behalf of the UDO/UDA writer. The advanced user can still read the temporal attributes (Vs and Ve) and use these temporal attributes inside the operator/aggregate logic.

Figure 2:
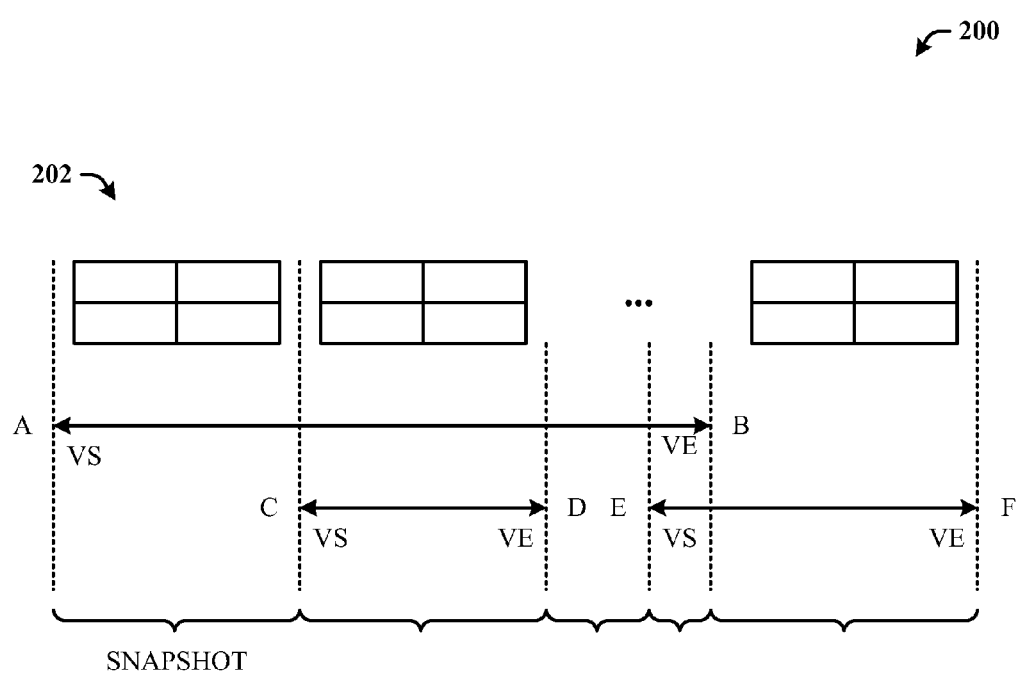
FIG. 2 illustrates an event stream that employs snapshot windows for stream-based user-defined modules.

FIG. 2 illustrates an event stream 200 that employs snapshot windows 202 for stream-based user-defined modules. A snapshot is the maximal time interval with the same set of co-located events. A snapshot-based operator computes its output over every snapshot based on the set of co-located events within the snapshot. In the data streaming model each tuple has two temporal attributes that denote the validity interval of the tuple: a valid start time (Vs) and a valid end time (Ve). A tuple timestamped with these temporal attributes is referred to as an event. Three co-located events are illustrated: a first event from times A to B, a second event from times C to D, and a third event from times E to F. The event stream 200 includes five snapshot windows 202 (where the vertical dotted line denotes a window boundary): a first snapshot window between times A and C, a second window between C and D, third window between times D and E, a fourth window between times E and B, and a fifth window between times B and F.

Figure 3:
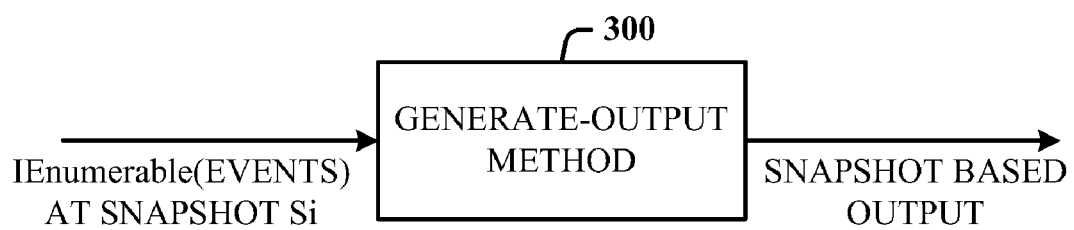
FIG. 3 illustrates a method that takes as input a window and generates a corresponding window output.

FIG. 3 illustrates a method 300 that takes as input a window and generates a corresponding window output. For example, here, the input is a snapshot window and the output of the method is a snapshot-based output. It is to be understood that generally, the GenerateOutput method generates an IEnumerable of output event payloads as a result of the operator computation over an IEnumerable of input event payloads.

Following is an example of a non-temporal user-defined UDA.

```
public class Sum
{
    public int GenerateOutput (IEnumerable<int> inputElements)
    {
        int sum = 0;
        foreach (int element in inputElements)
        {
            sum += element;
        }
        return sum;
    }
}
```

Following is an example of the use of override of the above UDA.

```
public class Sum
{
    public override int
    GenerateOutput (IEnumerable<int> input Elements)
    {
        int sum = 0;
        foreach (int element in inputElements)
        {
            sum += element;
        }
        return sum;
    }
}
```

Following is an example of an overridden UDO.

```
public class TopK
{
    public override IEnumerable<int>
    GenerateOutput (IEnumerable<int> inputElements)
    {
        ......
    }
}
```

Following is an example of converting a UDA to a time sensitive module and the use of override.

```
public class Sum : CepAggregate<int, int>
{
    public override int
    GenerateOutput (IEnumerable<int> inputElements
    {
        int sum = 0;
        foreach (int element in inputElements)
        {
            sum += element;
        }
        return sum;
    }
}
```

Following is an example of converting a UDO to a time sensitive module and the use of override.

```
public class TopK : CepOperator<int, int>
{
    public override IEnumerable<int>
    GenerateOutput (IEnumerable<int> inputElements)
    {
        ........ ..
    }
}
```

Figure 4:
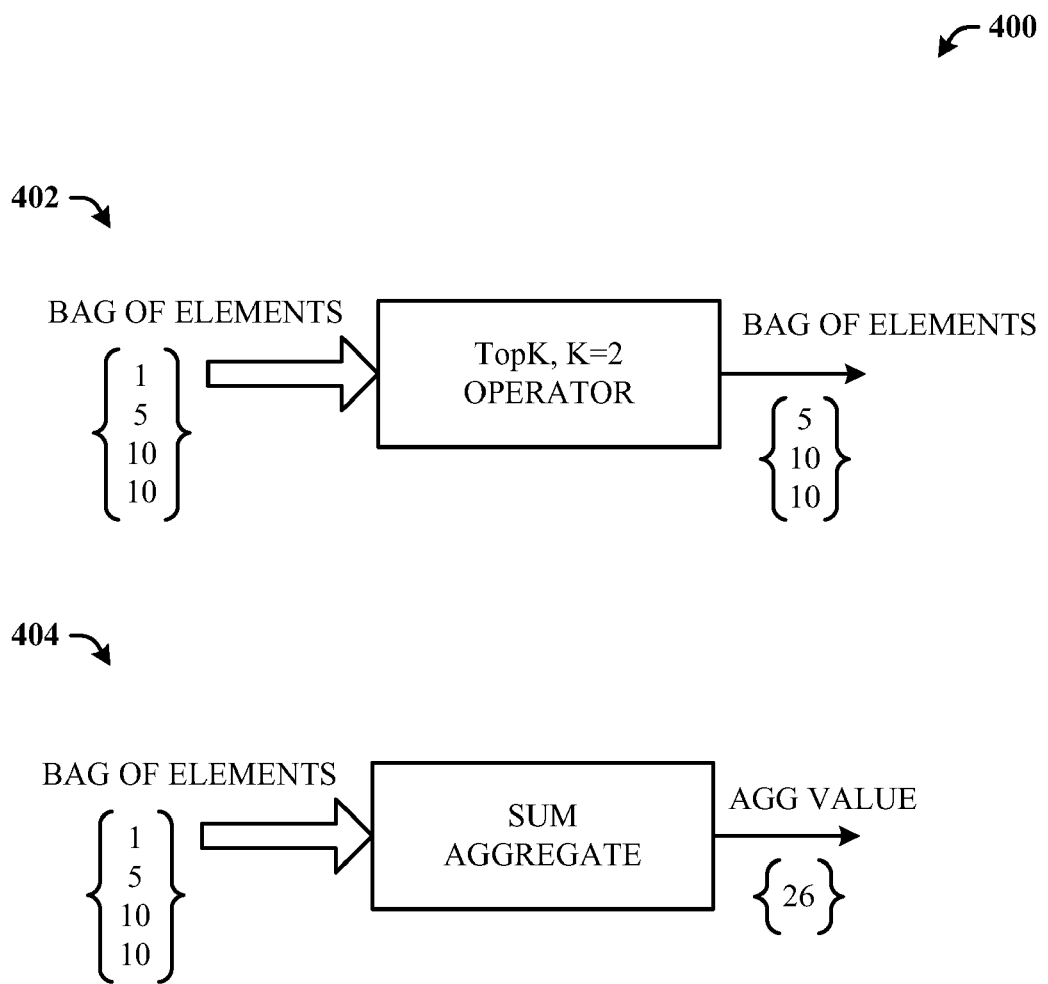
FIG. 4 illustrates examples of a user-defined operator and aggregator 404.

FIG. 4 illustrates examples 400 of a user-defined operator 402 and aggregator 404. For the UDO, the input is a bag of elements {1, 5, 10, 10} and the UDO outputs a bag that includes all elements of the two highest values of the input bag, to output {5, 10, 10}. This also shows that the output of the TopK UDO can include more elements than the parameter k due to duplicates. For the UDA, the input is the bag of elements {1, 5, 10, 10} and the UDA sums all elements to output the aggregate value of {26}.

The extensibility framework uses the notion of windows to manage the timeline on behalf of the UDO/UDA writer in the following way:

For every incoming event e that is Insert/retract/Expand:
  Compute the region of impact.
    For Insert, Start=e.Vs and End=e.Ve.
    For Retract, Start=e.Ve and End=e.NewVe.
    For Expand, Start=e.NewVe and End=e.Ve.
  For every window W that overlaps the region of impact:
  Compute an IEnumerable of all events that intersect the window (call it IE_Input).
  Generate an output event that is of type Retract and spans the window timespan and the payload of the (Retract, Vs=Window.Start, Window.End, UDA (IE_Input)).
  Add the incoming event to the IE_Input (call it IE_Input').
  Generate an output event that is of type Retract and spans the window timespan and the payload of the (Retract, Vs=Window.Start, Window.End, UDA (IE_Input')).

The disclosed architecture includes a notion of windowing which divides the infinite timeline of streamed event into smaller overlapping/non-overlapping pieces. The window types in the extensibility framework can include the following. A snapshot window is the maximal time interval with the same set of co-located events. A snapshot based operator computes its output over every snapshot based on the set of co-located events within the snapshot. A tumbling window is defined by a window size and an alignment. The alignment is a point of time that aligns a window boundary, the tumbling window divides the timeline into non-overlapping windows: each is equivalent to the window size. A hopping window is defined by a window size, hop size and an alignment. The alignment is a point of time that aligns a window boundary, the hopping window divides the timeline into overlapping windows: each is equivalent to the window size and the distance between the start of two consecutive windows is equivalent to the hop size. A count window is defined by the window size (k) or a count. Count window divides the timeline into windows, each window contains K events.

Note that for UDAs, the UDA returns a single field value per call. However, UDOs can return multiple values and an output event is generated based on each output value.

Figure 5:
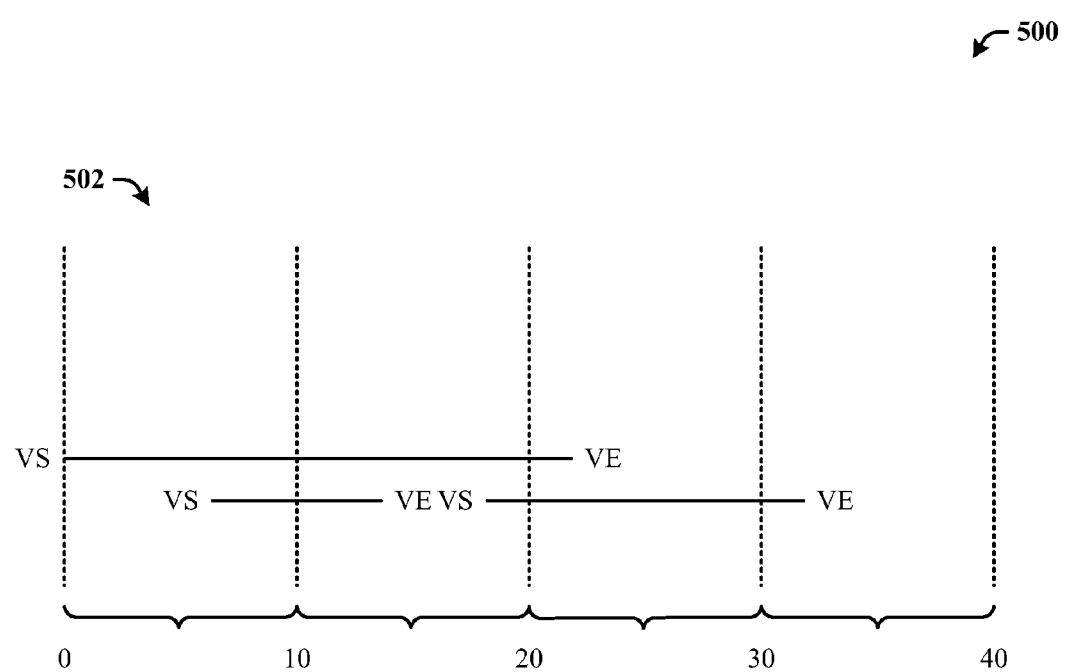
FIG. 5 illustrates an event stream that employs tumbling windows for stream-based user-defined modules.

FIG. 5 illustrates an event stream 500 that employs tumbling windows 502 for stream-based user-defined modules. A tumbling window is defined by window size and alignment. The alignment is a point in time that aligns to a window boundary. The tumbling window divides the timeline into non-overlapping windows each of which is equivalent to the window size. Here, four non-overlapping windows are depicted each having ten time units in size, and an alignment at each 10-unit boundary. Using the same events as in FIG. 2, rather than define the windows based on Vs and Ve, the windows are defined as the same size in time. Thus, the alignments are not necessarily at event start (Vs) or event end (Ve), but could be.

Figure 6:
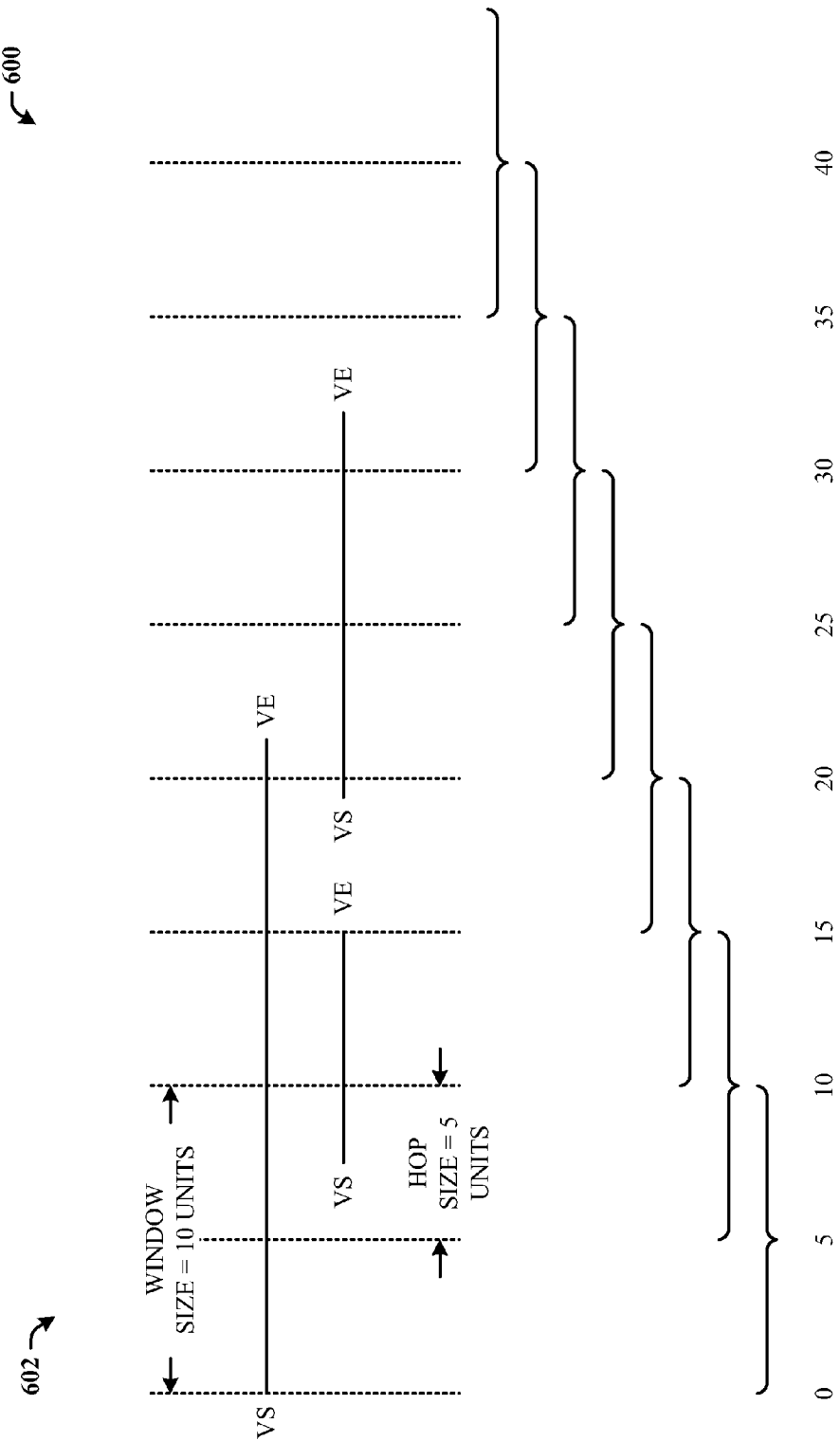
FIG. 6 illustrates event stream that employs hopping windows for stream-based user-defined modules.

FIG. 6 illustrates event stream 600 that employs hopping windows 602 for stream-based user-defined modules. A hopping window is defined by a window size, hop size, and an alignment. The hopping window divides the timeline into overlapping windows, where the windows are of equal size (here, ten units). The alignment is the point in time that aligns to a window boundary (vertical dotted line). The hop size the number of units of overlap from the start of one window to the start of another window (here, five units). In other words, the distance between the start of two consecutive windows is equivalent to the hop size.

Figure 7:
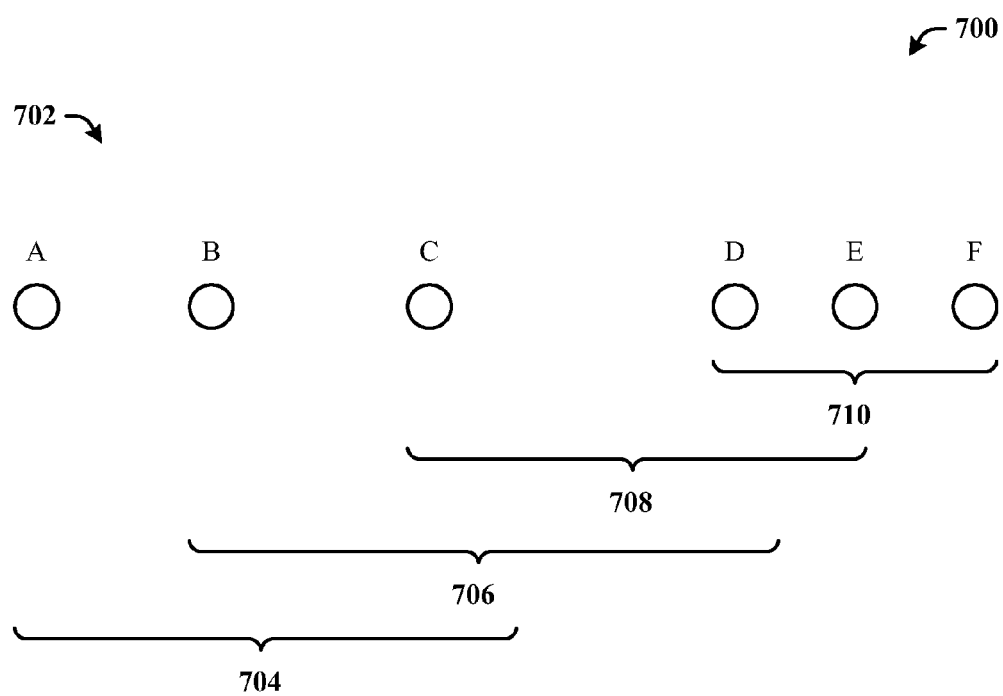
FIG. 7 illustrates event stream that employs count windows for stream-based user-defined modules.

FIG. 7 illustrates event stream 700 that employs count windows for stream-based user-defined modules. A count window is defined by the window size (K) or a count. The count window divides the timeline into windows, where each window contains K events 702. Here, six events (A-F) are depicted such that a first count window 704 includes events A-C, a second count window 706 includes events B-D, a third count window 708 includes events C-E, and a fourth count window 710 includes events D-F.

The disclosed architecture can handle time-insensitive and time sensitive UDO/UDA base abstract classes. With respect to time insensitive classes, the UDO/UDA writer is expected to implement logic in a class that derives from one of the system provided abstract classes CepOperator/CepAggregate, respectively. The Type parameters TInput, TOutput are the expected event types of the input/output of the UDO/UDA, respectively. The UDO/UDA writer overrides the GenerateOutput method to provide custom logic. The GenerateOutput method is expected to be invoked by the extensibility framework one or more times per window.

The framework passes an IEnumerable<TInput> of all event payloads that overlap the window as the "payloads" input parameter. The GenerateOutput method is expected to return an IEnumerable<TOutput> that represents the output in case of a UDO and to return a field of type TOutput in case of an aggregate. Note that only payloads (that contain no temporal attributes) are passed to the GenerateOutput method. Additionally, note that the returned output is automatically timestamped by the system to the window timespan, that is, OutputEvent.Vs=Window. Start and OutputEvent.Ve=Window.End

```
publicabstractclassCepOperator<TInput, TOutput> : CepModule
  <TInput,TOutput>
{
///<summary>
/// The GenerateOutput method generates an IEnumerable of output
/// event payloads as a result of the operator computation over an
/// IEnumerable of input event payloads.
///</summary>
///<param name="payloads">Bag of input event payloads</param>
///<returns>Bag of output event payloads</returns>
publicabstractIEnumerable<TOutput> GenerateOutput
  (IEnumerable<TInput> payloads);
}
publicabstractclassCepAggregate<TInput, TOutput> : CepModule
  <TInput,TOutput>
{
///<summary>
/// The GenerateOutput method generates a single scalar value as a
/// result of the aggregate computation over an IENumerable of input
```

```
    /// event payloads.
    ///</summary>
    ///<param name="payloads">Bag of input event payloads</param>
    ///<returns>Result of the aggregation</returns>
    publicabstract TOutput GenerateOutput (IEnumerable<TInput>
    payloads);
    }
```

With respect to time-sensitive UDO/UDA base abstract classes, for advanced users interested in reading the event lifetime, another set of abstract classes is provided. The generateOutput method takes an IEnumerable of events (an event contains the payload as well as the temporal dimensions Vs/Ve) as well as the window descriptor. The window descriptor is a struct that contains the start and the end times of the window. The UDO/UDA writer can use the temporal attributes Vs/Ve as well as the window descriptor in computations.

In case of a UDA, the GenerateOutput method is expected to return the aggregate value that is timestamped automatically by the framework to the window timespan, that is, OutputEvent.Vs=Window.Start and OutputEvent.Ve=Window.End.

```
    publicabstractclassCepTimeSensitiveAggregate<TInput, TOutput> :
    CepTimeSensitiveModule<TInput, TOutput>
    {
    ///<summary>
    /// The GenerateOutput method generates a single scalar value as a
    /// result of the aggregate computation over an IEnumerable of input
    /// events.
    /// </summary>
    ///<param name="events">Bag of input events</param>
    ///<param name="windowDescriptor">The window descriptor of
    the window
    /// that contains the input events. </param>
    ///<returns>Payload that represents the aggregate value</returns>
    publicabstract TOutput
    GenerateOutput (IEnumerable<IntervalEvent<TInput>> events,
    WindowDescriptor windowDescriptor);
    }
```

In the case of a UDO, the GenerateOutput method is expected to return an IEnumerable of timestamped events. The UDO writer uses the CreateIntervalEvent method in the base class to create an event, and then timestamps the event before it is added to the returned IEnumerable<TOutput>.

```
    publicabstractclassCepTimeSensitiveOperator<TInput, TOutput> :
    CepTimeSensitiveModule<TInput, TOutput>
    {
    ///<summary>
    /// The GenerateOutput method generates an IEnumerable of output
    /// events as a result of the operator computation over an
    /// IEnumerable of input events.
    ///</summary>
    ///<param name="events">Bag of input events</param>
    ///<param name="windowDescriptor">The window descriptor of
    the window
    /// that contains the input events.</param>
    ///<returns>Bag of output payloads</returns>
    publicabstractIEnumerable<IntervalEvent<TOutput>>
    GenerateOutput(IEnumerable<IntervalEvent<TInput>> events,
    WindowDescriptor windowDescriptor);
    ///<summary>
    /// This method is called by the derived classes that are implemented
    /// by the UDO writer to create an output event.
    ///</summary>
```

```
    ///<returns>An interval event.</returns>
    publicIntervalEvent<TOutput> CreateIntervalEvent ( )
    {
    returnnewIntervalEvent<TOutput> ( );
    }
    }
```

With respect to CTI management, the description above addresses framework handling of insertion, retraction, or expansion. The CTI guarantees that nothing is going to change in the past before the CTI given Vs. The CTI gives the guarantee that nothing is going to arrive before a certain point in time because events are expected to arrive late in the system.

For non-window based operators, the CTI that is received in the input is propagated to the output without changing the CTI timestamp.

For window-based operators, special attention has to be paid to CTI processing. The framework pushes the CTI timestamp backward to the beginning of the window that received the CTI. This is because window based operators aggregates the values in the window and generates the output on a window-basis (spans the entire window duration). This means that something that comes after the CTI timestamp is expected to generate output from the beginning of the window, which can be before the CTI actual timestamp. To avoid CTI violations, we move the CTI backward to the beginning of the window.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
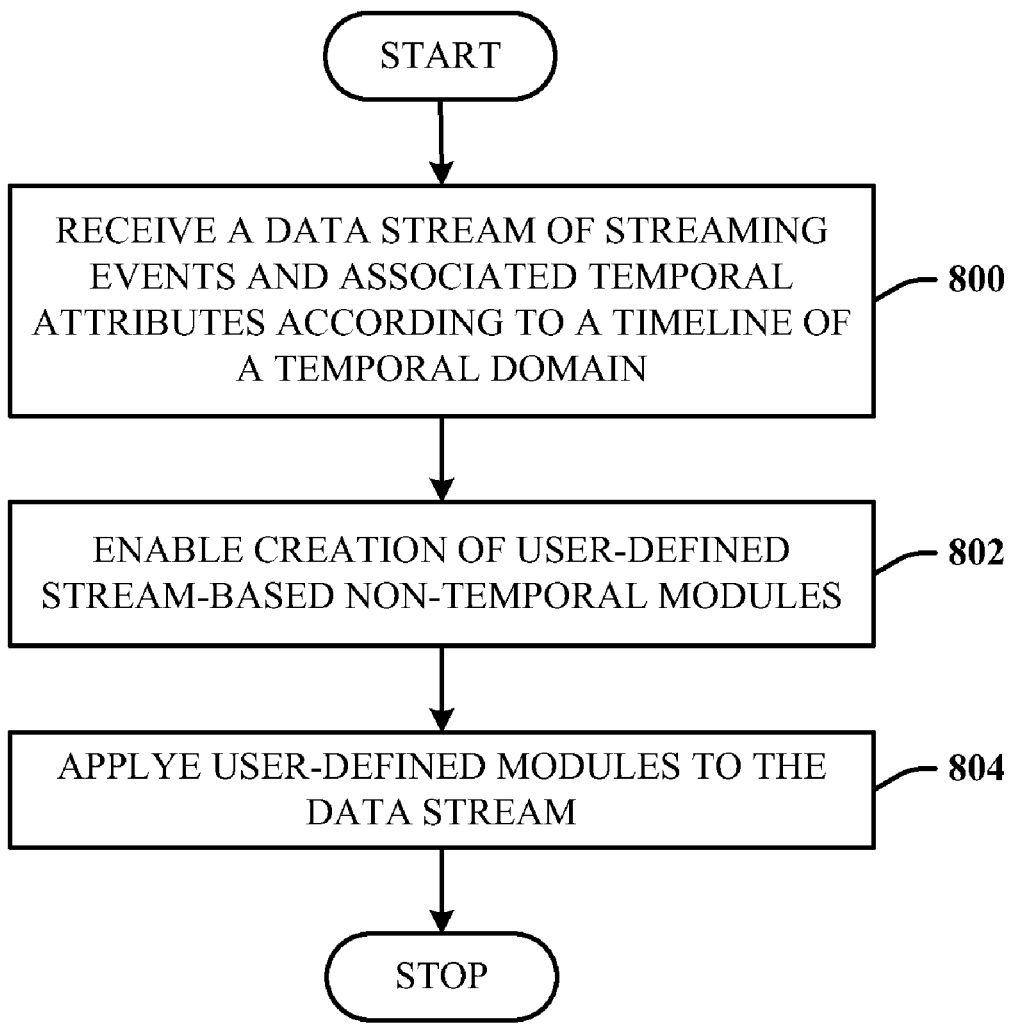
FIG. 8 illustrates a computer-implemented stream-based method in accordance with the disclosed architecture.

FIG. 8 illustrates a computer-implemented stream-based method in accordance with the disclosed architecture. At 800, a data stream of streaming events and associated temporal attributes are received according to a timeline of a temporal domain. At 802, the creation of user-defined stream-based non-temporal modules is enabled. At 804, the user-defined modules are applied to the data stream.

Figure 9:
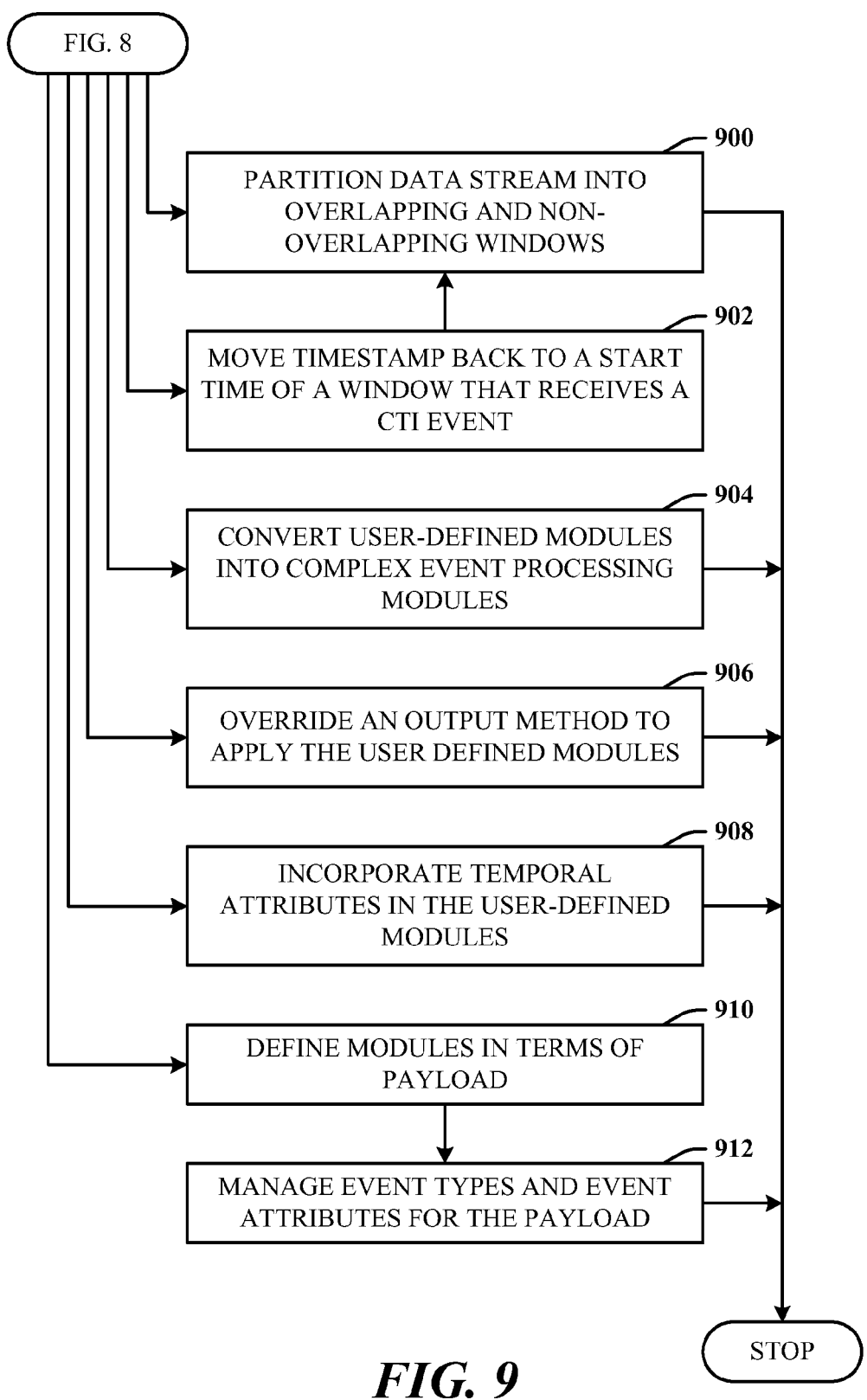
FIG. 9 illustrates further aspects of the method of FIG. 8.

FIG. 9 illustrates further aspects of the method of FIG. 8. At 900, the data stream is partitioned into overlapping and non-overlapping windows. At 902, a timestamp is moved back to a start time of a window that receives a CTI event. At 904, the user-defined modules are converted into complex event processing modules. At 906, an output method is overridden to apply the user defined modules. At 908, the temporal attributes are incorporated in the user-defined modules. At 910, the modules are defined in terms of payload. At 912, event types and event attributes are managed for the payload.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
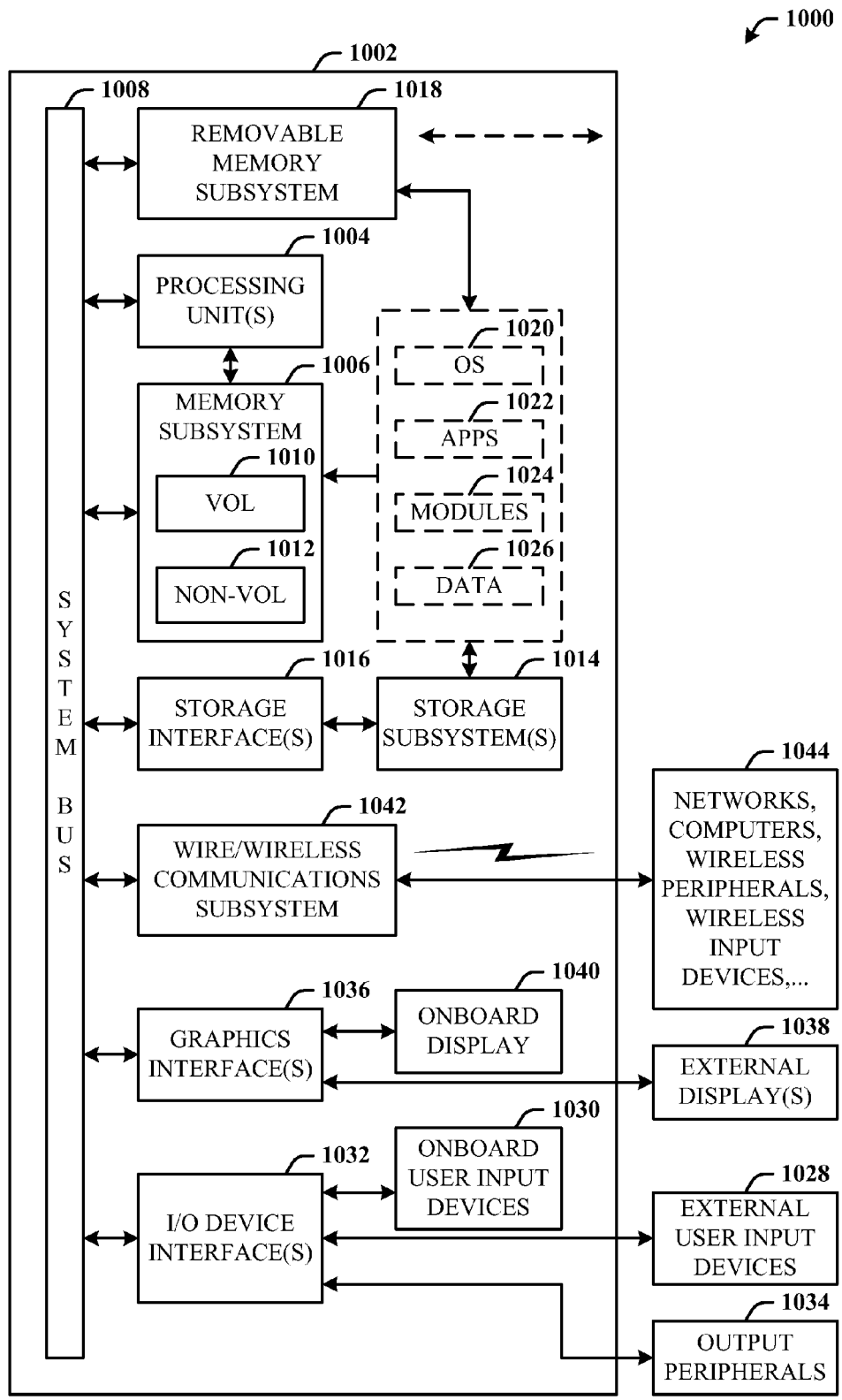
FIG. 10 illustrates a block diagram of a computing system that executes stream-based processing and extensibility in accordance with the disclosed architecture.

Referring now to FIG. 10, there is illustrated a block diagram of a computing system 1000 that executes stream-based processing and extensibility in accordance with the disclosed architecture. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The one or more application programs 1022, other program modules 1024, and program data 1026 can include the entities and components of the system 100 of FIG. 1, the event stream 200 of FIG. 2, the method 300 of FIG. 3, the examples 400 of FIG. 4, the event stream 500 of FIG. 5, the event stream 600 of FIG. 6, the event stream 700 of FIG. 7, and the methods represented by the flowcharts of FIGS. 8 and 9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented stream-based system having computer readable media that store executable instructions executed by a processor, comprising:
   a data streaming system for processing events and associated event attributes occurring in an infinite timeline of a temporal domain;
   an extensibility component that facilitates creation and application by a user of user-defined stream-based modules in a non-temporal domain, to perform at least one of operations or aggregations upon the events and the associated event attributes of the data streaming system in the temporal domain, wherein the stream-based modules include window-based operators associated with a current time increment event which guarantees no changes occur before a start time of an event by moving a current time increment timestamp to a beginning of a window, the current time increment timestamp is propagated to an output for non-window-based operators;
   a windowing component that employs a time window for dividing the timeline of events into segments, to bridge the non-temporal domain and the temporal domain; and
   a microprocessor that executes computer-executable instructions associated with at least one of data streaming system, the extensibility component, or the windowing component.

2. The system of claim 1, wherein the stream-based modules are user-defined stream-based operators and user-defined stream-based aggregators.

3. The system of claim 2, wherein the stream-based modules are time sensitive and time insensitive.

4. The system of claim 1, wherein the windowing component employs a time window which divides an infinite timeline of streaming data into overlapping segments.

5. The system of claim 4, wherein the windowing component employs a time window which divides an infinite timeline of streaming data into non-overlapping segments.

6. The system of claim 1, wherein the stream-based modules include complex event processing base classes.

7. The system of claim 1, wherein the stream-based modules include window-based operators associated with a current time increment (CTI) event which guarantees that no changes occur before a start time of an event by moving the CTI timestamp to a beginning of a window.

8. The system of claim 7, wherein the CTI timestamp is propagated to an output for non-window-based operators.

9. A computer-implemented stream-based system having computer readable media that store executable instructions executed by a processor, comprising:
   a data stream of streaming events and associated temporal attributes according to an infinite timeline of a temporal domain;
   an extensibility component that facilitates creation and application by a user of user-defined stream-based modules in a non-temporal domain to the data stream, to perform operations or aggregations upon the streaming events and the associated temporal attributes, wherein the stream-based modules include window-based operators associated with a current time increment event which guarantees no changes occur before a start time of an event by moving a current time increment timestamp to a beginning of a window, the current time increment timestamp is propagated to an output for non-window-based operators;

a windowing component that employs windowing to divide the timeline into at least one of overlapping segments or non-overlapping segments for application of the modules; and a microprocessor that executes computer-executable instructions associated with at least one of data stream, the extensibility component, or the windowing component.

10. The system of claim 9, wherein the user-defined non-temporal stream-based modules are stream-based operators and stream-based aggregators that are time sensitive and time insensitive.

11. The system of claim 9, wherein the stream-based modules include complex event processing base classes.

12. The system of claim 9, wherein the user-defined modules are written in terms of payload only, and the extensibility component manages event types and event attributes in the temporal domain.

13. A computer-implemented stream-based method performed by a computer system executing machine-readable instructions, the method, comprising acts of:

receiving a data stream of streaming events and associated temporal attributes according to a timeline of a temporal domain;

enabling creation of user-defined stream-based non-temporal modules;

partitioning the data stream into windows representing segments of a timeline of streaming events; and applying the user-defined modules to the data stream.

14. The method of claim 13, further comprising partitioning the data stream into overlapping and non-overlapping windows.

15. The method of claim 14, further comprising moving a timestamp back to a start time of a window that receives a current time increment event.

16. The method of claim 13, further comprising converting the user-defined modules into complex event processing modules.

17. The method of claim 13, further comprising overriding an output method to apply the user defined modules.

18. The method of claim 13, further comprising incorporating the temporal attributes in the user-defined modules.

19. The method of claim 13, further comprising:
defining the modules in terms of payload: and
managing event types and event attributes for the payload.

* * * * *

UNITED STATES PATENT AND TRADEMARK OFFICE
CERTIFICATE OF CORRECTION

PATENT NO. : 8,381,233 B2  
APPLICATION NO. : 12/777259  
DATED : February 19, 2013  
INVENTOR(S) : Mohamed H. Ali et al.

Page 1 of 2

It is certified that error appears in the above-identified patent and that said Letters Patent is hereby corrected as shown below:

In the Drawings

In Drawing, Sheet 8 of 10, Fig. 8, line 1, delete "APPLYE" and insert -- APPLY --, therefor.

In the Specification

In column 4, line 28 (Approx.), delete "input Elements" and insert -- inputElements --, therefor.

In column 6, line 49, after "Window.End" insert -- . --.

In column 6, line 66, delete "IENumerable" and insert -- IEnumerable --, therefor.

In the Claims

In column 13 & 14, lines 25-27 & 1-8, in Claim 13, delete "13. A computer-implemented stream-based method performed by a computer system executing machine-readable instructions, the method, comprising acts of: receiving a data stream of streaming events and associated temporal attributes according to a timeline of a temporal domain; enabling creation of user-defined stream-based non-temporal modules; partitioning the data stream into windows representing segments of a timeline of streaming events; and applying the user-defined modules to the data stream." and insert -- 13. A computer-implemented stream-based method performed by a computer system executing machine-readable instructions, the method, comprising acts of: processing a data stream of streaming events and associated temporal attributes according to an infinite timeline of a temporal domain: enabling creation and application of user-defined stream-based non-temporal modules in a non-temporal domain to the data stream to perform operations or aggregations upon the streaming events and the associated temporal attributes, wherein the stream-based modules include window-based operators associated with a current time increment event which guarantees no changes Signed and Sealed this  
Tenth Day of February, 2015

Michelle K. Lee  
*Deputy Director of the United States Patent and Trademark Office* occur before a start time of an event by moving a current time increment timestamp to a beginning of a window, the current time increment timestamp is propagated to an output for non-window-based operators; partitioning the data stream into time windows representing segments of a timeline of streaming events, to bridge the non-temporal domain and the temporal domain; and applying the user-defined modules to the data stream. --, therefor.

In column 14, line 23, in Claim 19, delete "payload:" and insert -- payload; --, therefor.